(12) United States Patent
Hirata

(10) Patent No.: US 10,572,546 B2
(45) Date of Patent: Feb. 25, 2020

(54) INFORMATION PROCESSING APPARATUS, DOCUMENT DISPLAY METHOD, DOCUMENT DISPLAY SYSTEM, AND MEDIUM

(71) Applicant: CANON KABUSHIKI KAISHA, Tokyo (JP)

(72) Inventor: Kensuke Hirata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 15/710,303

(22) Filed: Sep. 20, 2017

(65) Prior Publication Data

US 2018/0101525 A1    Apr. 12, 2018

(30) Foreign Application Priority Data

Oct. 11, 2016    (JP) .................. 2016-200473

(51) Int. Cl.
*G06F 17/30*    (2006.01)
*G06F 16/93*    (2019.01)
(Continued)

(52) U.S. Cl.
CPC ............ *G06F 16/93* (2019.01); *G06F 16/955* (2019.01); *G06F 16/958* (2019.01);
(Continued)

(58) Field of Classification Search
CPC ............... G06F 17/243; G06F 16/9577; G06F 21/6209; G06F 16/116; G06F 16/84;
(Continued)

(56) References Cited

U.S. PATENT DOCUMENTS 9,886,426 B1 *    2/2018    Taylor ................. G06F 16/84
2002/0065800 A1    5/2002    Morlitz
(Continued)

FOREIGN PATENT DOCUMENTS

| JP | 2001-022631 A | 1/2001 |
| WO | 01/050298 A2 | 7/2001 |
| WO | 02/010905 A2 | 2/2002 |

OTHER PUBLICATIONS

The above references were cited in a Dec. 15, 2017 European Patent Office Search Report, a copy of which is enclosed, that issued in the counterpart European Patent Application No. 17001525.9.

(Continued)

*Primary Examiner* — Dangelino N Gortayo
(74) *Attorney, Agent, or Firm* — Cowan, Liebowitz & Latman, P.C.

(57) ABSTRACT

An information processing apparatus is provided that is connected to a server that archives document data hierarchically formed by a plurality of files and stores the document data as a single file, comprising: a downloading unit configured to download the archived document data from the server, decompressing the archived document data, and storing a file forming a lower layer of the document data in a storage unit; a browser unit configured to access an access destination of the file forming the lower layer which is described in an upper layer file of the document data; and a readout unit configured to read out the file forming the lower layer by hooking the access and returning the read out file to the browser unit instead of the server, wherein the browser unit displays the document data based on the read out file.

11 Claims, 14 Drawing Sheets

(51) Int. Cl.
*G06F 16/955* (2019.01)
*G06F 16/958* (2019.01)
*G06F 16/957* (2019.01)
G06F 16/84 (2019.01)
G06F 16/11 (2019.01)

(52) U.S. Cl.
CPC ........ *G06F 16/9574* (2019.01); *G06F 16/116* (2019.01); *G06F 16/84* (2019.01); *G06F 16/9577* (2019.01)

(58) Field of Classification Search
CPC .... G06F 16/93; G06F 16/178; G06F 16/1794; G06F 16/185; G06F 16/345
USPC ................ 707/610, 635, 705, 709, 756, 783
See application file for complete search history.

(56) References Cited

U.S. PATENT DOCUMENTS

| | | | |
|---|---|---|---|
| 2008/0046254 A1* | 2/2008 | Nuno | G06F 17/2264 705/305 |
| 2008/0147957 A1* | 6/2008 | Fujimaki | G06F 16/84 711/100 |
| 2010/0180213 A1* | 7/2010 | Karageorgos | G06F 16/93 715/753 |
| 2013/0238969 A1* | 9/2013 | Smith | G06F 17/212 715/230 |
| 2013/0262386 A1* | 10/2013 | Kottomtharayil | G06F 1/3234 707/635 |
| 2015/0082386 A1* | 3/2015 | Safa | G06F 16/116 726/4 |
| 2016/0062976 A1* | 3/2016 | Wang | G06F 17/243 715/222 |

OTHER PUBLICATIONS

Wills C E et al: "Using bundles for Web content delivery", Computer Networks, Elsevier, Amsterdam, NL, vol. 42, No. 6, Aug. 21, 2003, pp. 797-817, XP004438950, ISSN: 1389-1286, DOI: 10.1016/S1389-1286(03)00221-4.

Julius C. Mong, et al., "Using SVG as the Rendering Model for Structured and Graphically Complex Web Material", Electrical Publishing Research Group School of Computer Science & IT University of Nottingham, pp. 88-91, 2003.

The above reference was cited in a European Office Action dated Jun. 12, 2019, a copy of which is enclosed, that issued in the corresponding European Patent Application No. 17001525.9.

* cited by examiner

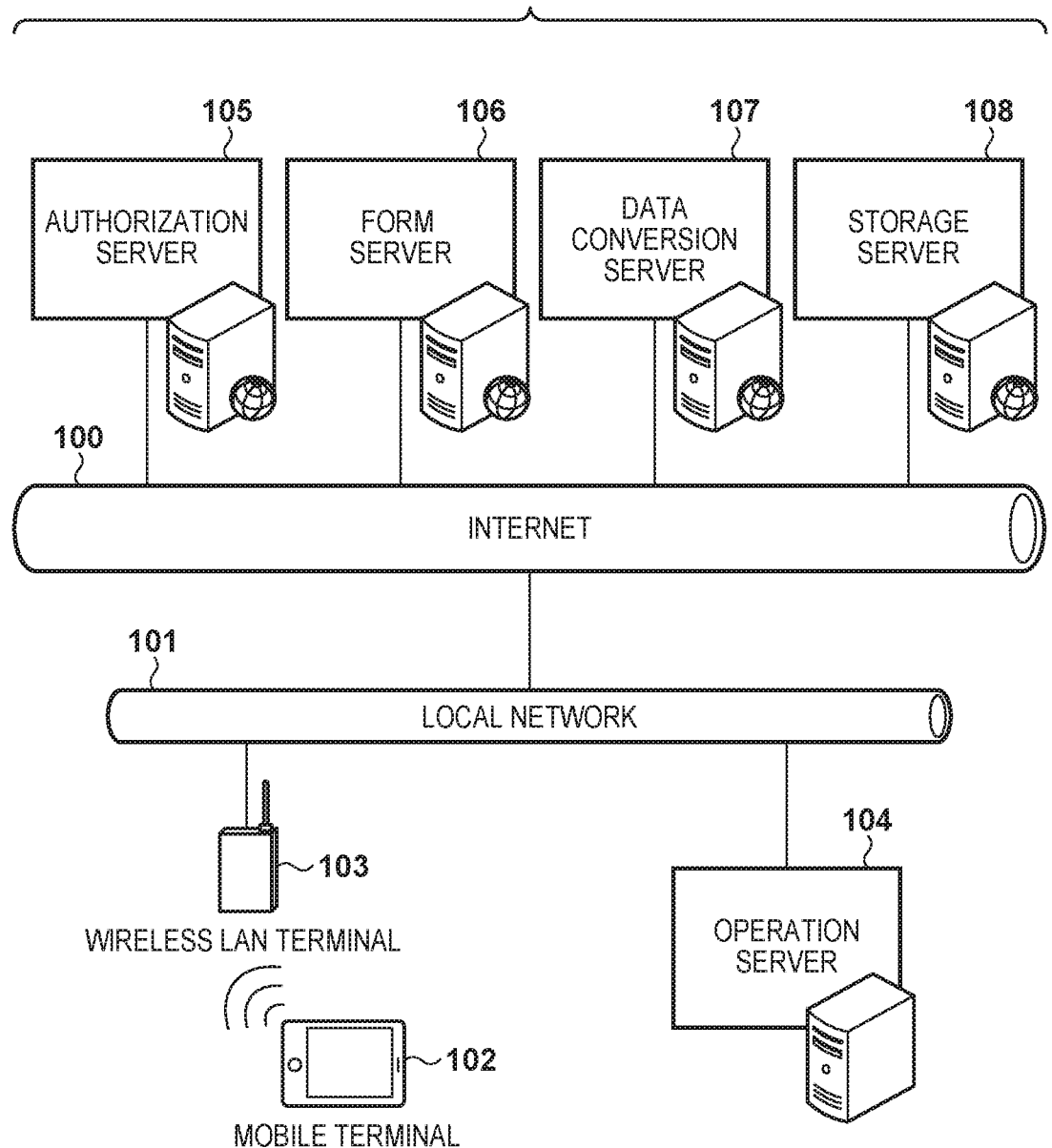

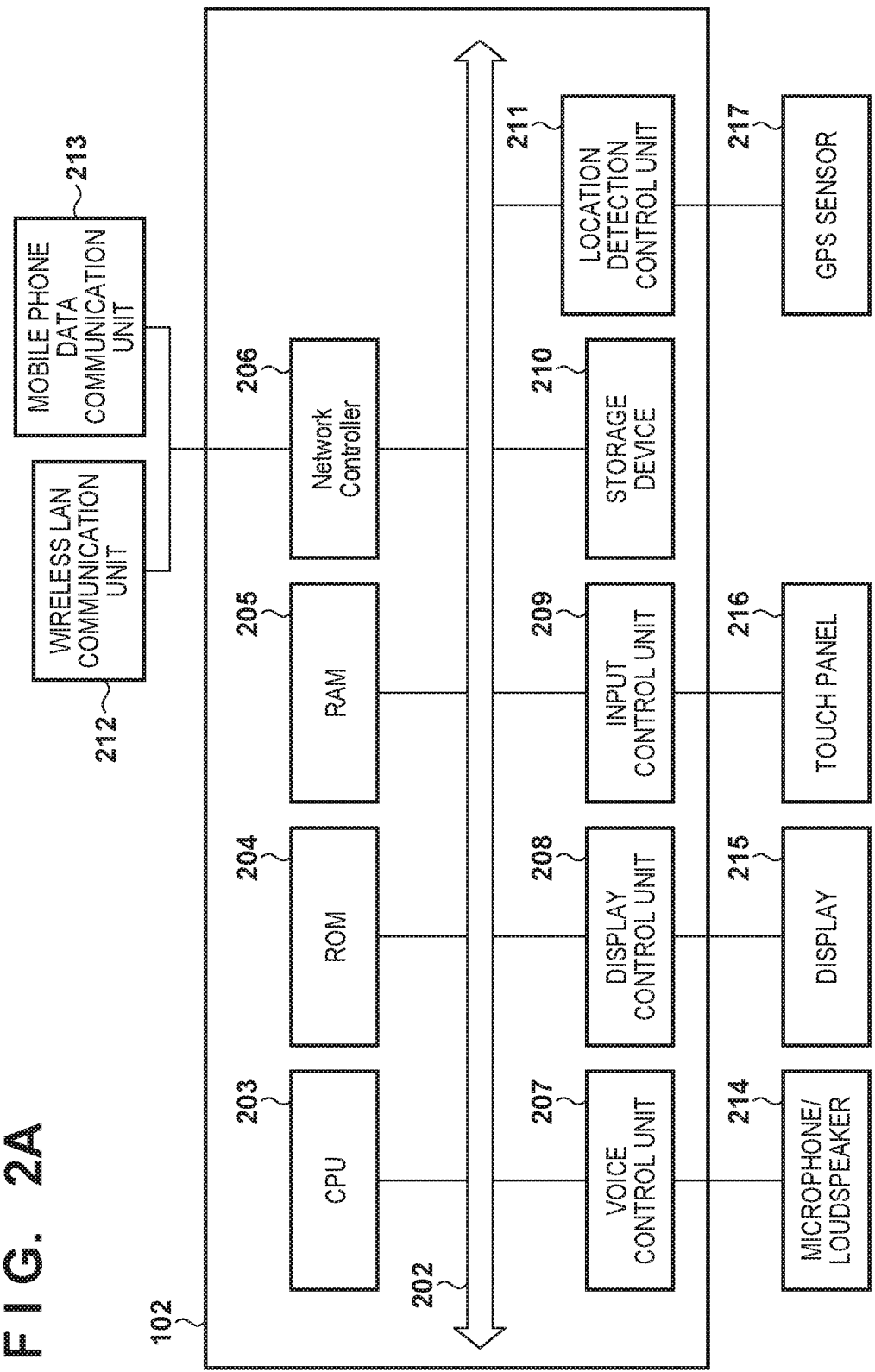

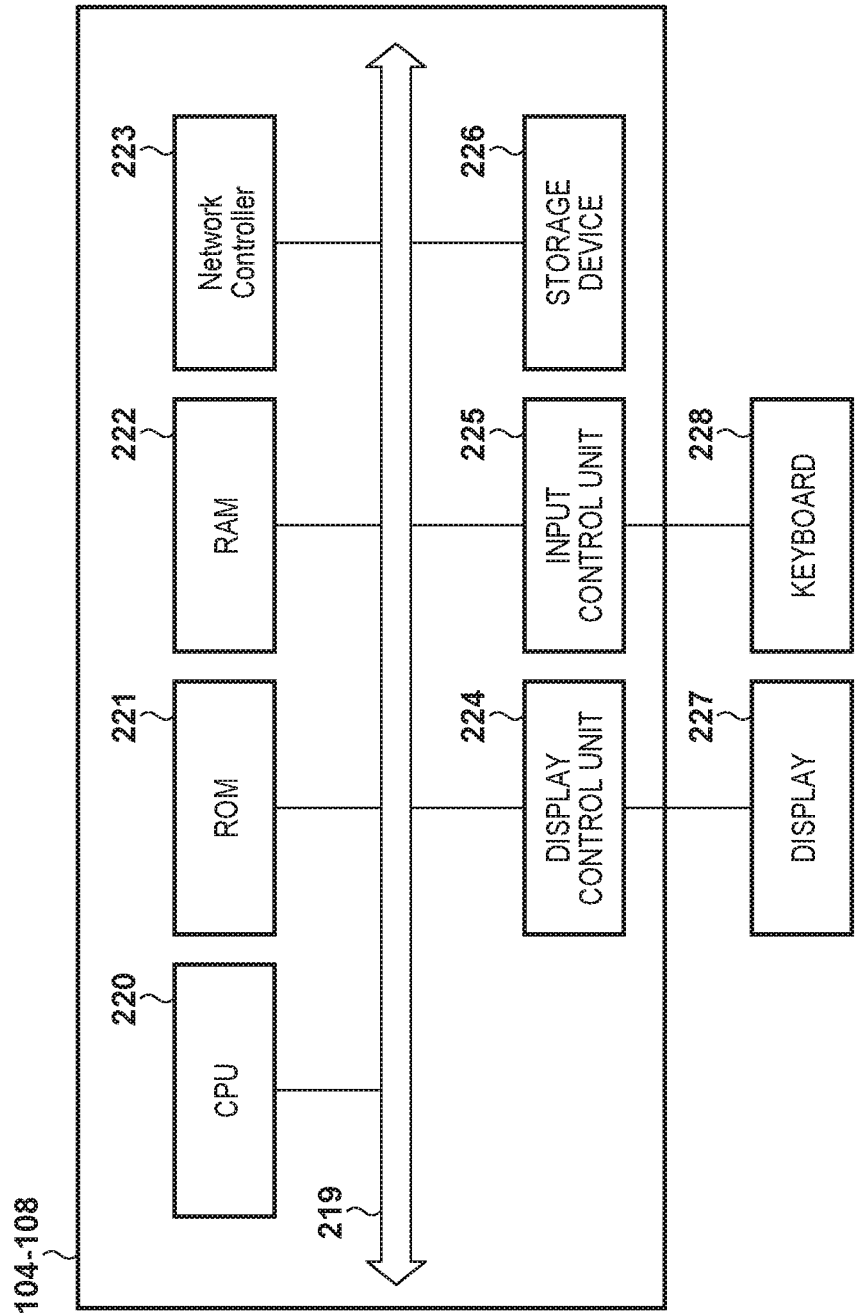

FIG. 3B

| PREVIEW ID | TENANT ID | USER ID | DATA CONVERSION ID | FORM PDF URL PATH |
|---|---|---|---|---|
| ff169537-acd7-46f5-9cd6-73df860334f4 | user_tenant1 | user_tenant1_user1@localserver1.net | e31aafc9-7a6f-4f9f-9b4d-f3754bc08103 | /frm/formpdfs/ff169537-acd7-46f5-9cd6-73df86033f4/ff169537-acd7-46f5-9cd6-73df86033f4.pdf |
| 1dd3b180-57fe-11e4-8eca-0a85caef494e | user_tenant1 | user_tenant1_user2@localserver1.net | 994689f0-b088-4784-9d76-0e247ce7a11f | /frm/formpdfs/1dd3b180-57fe-11e4-8eca-0a85caef494e/1dd3b180-57fe-11e4-8eca-0a85caef494e.pdf |
| 8c5ea5a0-597b-11e4-8eca-0a85caef494e | user_tenant2 | user_tenant2_user1@localserver2.net | e322ee00-c74e-4225-b434-6291dc5deb2d | /frm/formpdfs/8c5ea5a0-597b-11e4-8eca-0a85caef494e/8c5ea5a0-597b-11e4-8eca-0a85caef494e.pdf |

310

311 312 313 314 315

F I G. 4A

| DOCUMENT ID | TENANT ID | USER ID | DOCUMENT URL PATH |
|---|---|---|---|
| d2b3604d-b3cb-49d3-81bc-3a8de3bc1b98 | user_tenant1 | user_tenant1_user1@localserver1.net | /frm/formpdfs/ff169537-acd7-46f5-9cd6-73df860334f4/ff169537-acd7-46f5-9cd6-73df860334f4.pdf |
| 3d3a7b75-171a-4e8e-b4be-f927aa2f6a0a | user_tenant1 | user_tenant1_user2@localserver1.net | /frm/formpdfs/1dd3b180-57fe-11e4-8eca-0a85caef494e/1dd3b180-57fe-11e4-8eca-0a85caef494e.pdf |
| 70618aee-867d-4a7a-9f37-ed210d399120 | user_tenant2 | user_tenant2_user1@localserver2.net | /frm/formpdfs/8c5ea5a0-597b-11e4-8eca-0a85caef494e/8c5ea5a0-597b-11e4-8eca-0a85caef494e.pdf |

FIG. 4B

| DATA CONVERSION ID | TENANT ID | USER ID | DOCUMENT ID | INDEX URL PATH | STATUS |
|---|---|---|---|---|---|
| e31aafc9-7a6f-4f9f-9b4d-f3754bc08103 | user_tenant1 | user_tenant1_user1@localserver1.net | d2b3604d-b3cb-49d3-81bc-3a8de3bc1b98 | /cnv/convertjobs/e31aafc9-7a6f-4f9f-9b4d-f3754bc08103/index/index.json | CONVERSION COMPLETE |
| 994689f0-b088-4784-9d76-0e247ce7a11f | user_tenant1 | user_tenant1_user2@localserver1.net | 3d3a7b75-171a-4e8e-b4be-f927aa2f6a0a | /cnv/convertjobs/994689f0-b088-4784-9d76-0e247ce7a11f/index/index.json | CONVERSION COMPLETE |
| e322ee00-c74e-4225-b434-6291dc5deb2d | user_tenant2 | user_tenant2_user1@localserver2.net | 70618aee-867d-4a7a-9f37-ed210d399120 | /cnv/convertjobs/e322ee00-c74e-4225-b434-6291dc5deb2d/index/index.json | IN STANDBY |

FIG. 5

| DATA URL | FILE PATH |
|---|---|
| https://storage.net/frm/forms/45787890-34e4-32a4-8921-44665544000/45787890-34e4-32a4-8921-4466554440000.fcp | /frm/forms/45787890-34e4-32a4-8921-44665544000/45787890-34e4-32a4-8921-4466554440000.fcp |
| https://storage.net/frm/formpdfs/ff169537-acd7-46f5-9cd6-73df860334f4/ff169537-acd7-46f5-9cd6-73df860334f4.pdf | /frm/formpdfs/ff169537-acd7-46f5-9cd6-73df860334f4/ff169537-acd7-46f5-9cd6-73df860334f4.pdf |
| https://storage.net/frm/formpdfs/1dd3b180-57fe-11e4-8eca-0a85caef494e/1dd3b180-57fe-11e4-8eca-0a85caef494e.pdf | /frm/formpdfs/1dd3b180-57fe-11e4-8eca-0a85caef494e/1dd3b180-57fe-11e4-8eca-0a85caef494e.pdf |
| https://storage.net/cnv/convertjobs/e31aafc9-7a6f-4f9f-9b4d-f3754bc08103/index/index.json | /cnv/convertjobs/e31aafc9-7a6f-4f9f-9b4d-f3754bc08103/index/index.json |
| https://storage.net/cnv/convertjobs/e31aafc9-7a6f-4f9f-9b4d-f3754bc08103/data/page1.zip | /cnv/convertjobs/e31aafc9-7a6f-4f9f-9b4d-f3754bc08103/data/page1.zip |
| https://storage.net/cnv/convertjobs/e31aafc9-7a6f-4f9f-9b4d-f3754bc08103/data/page2.zip | /cnv/convertjobs/e31aafc9-7a6f-4f9f-9b4d-f3754bc08103/data/page2.zip |

FIG. 6A

SALES NEGOTIATION SCREEN

DATE 2010/2/18
NAME △△△△△
DATE OF BIRTH  19xx YEAR  xx MONTH  xx DAY
ADDRESS TOKYO-TO XXXX1-1-1

| PRODUCT NAME | PRICE |
|---|---|
| ○○ INSURANCE | ¥3,000 |
| XX INSURANCE | ¥2,500 |
| △△△ OPTIONAL CONTRACT | ¥700 |

TOTAL ¥6,200

601 — [GENERATE FORM]

FIG. 6B

PREVIEW SCREEN xxxxxxxx LIFE INSURANCE

DATE 2010/2/18
NAME △△△△△
DATE OF BIRTH 19xxYEAR xxMONTH xxDAY
ADDRESS TOKYO-TO XXXX1-1-1 xxxxxxx  xxxxxxx
xxxxxxx  xxxxxxx

| PRODUCT NAME | PRICE |
|---|---|
| ○○ INSURANCE | ¥3,000 |
| XX INSURANCE | ¥2,500 |
| △△△ OPTIONAL CONTRACT | ¥700 |

TOTAL ¥6,200

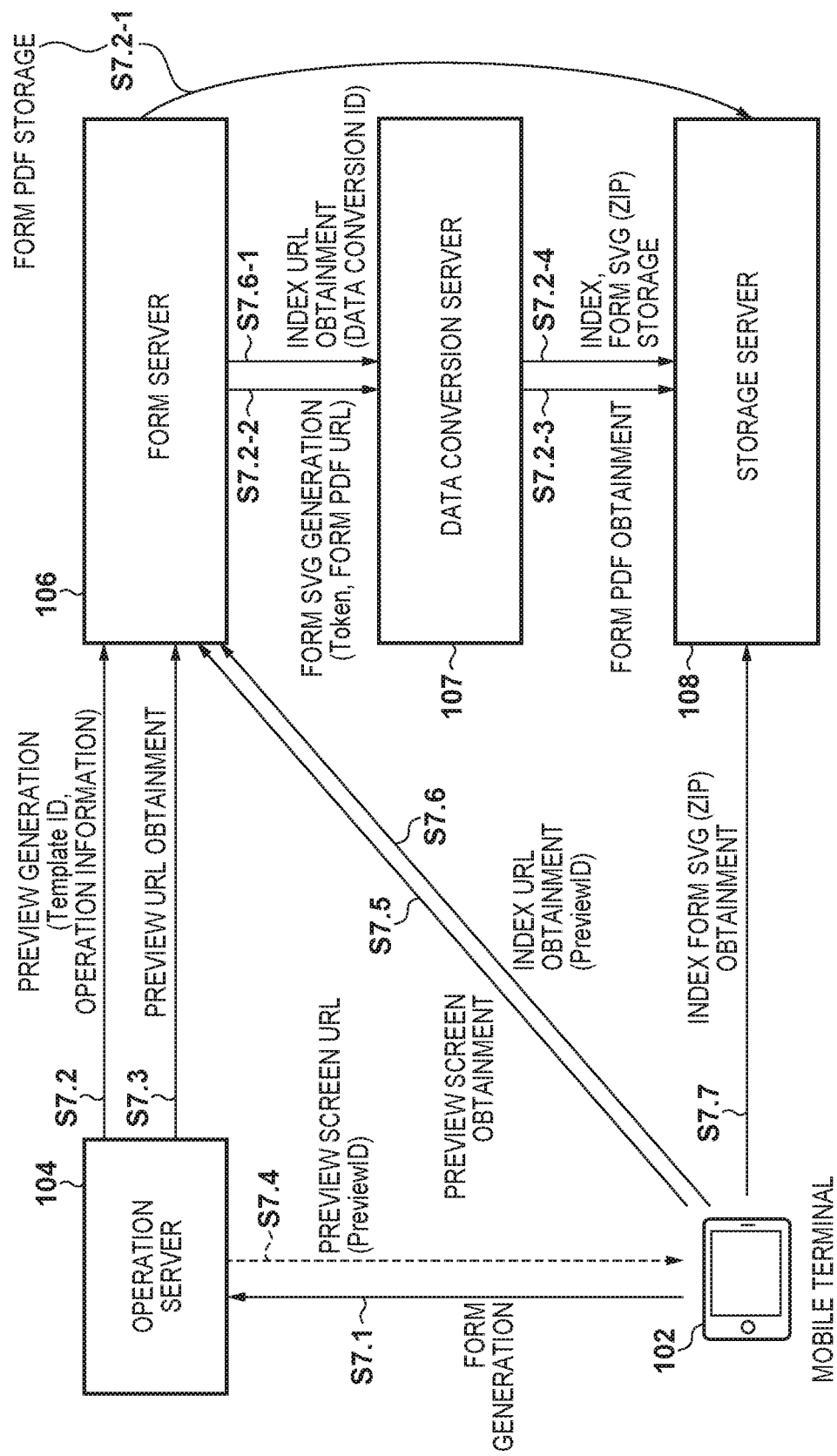

FIG. 8A
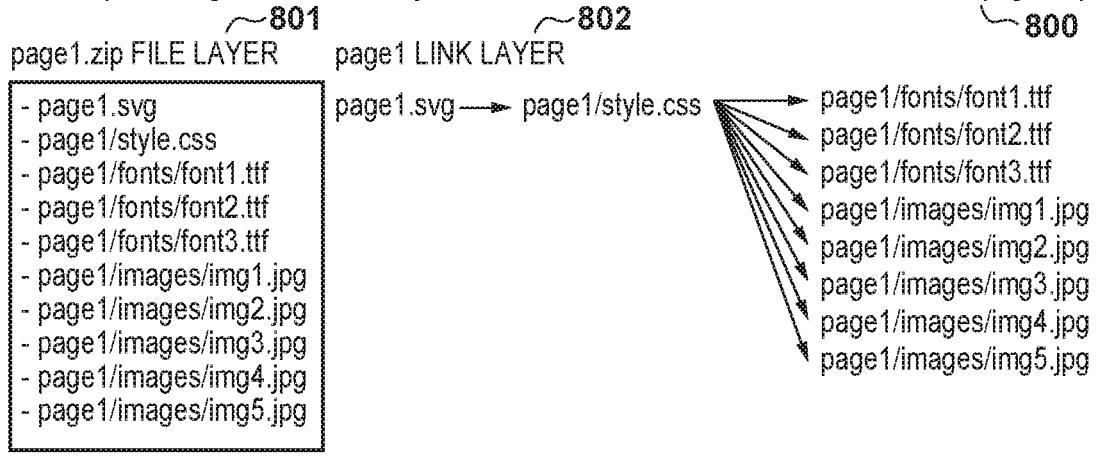
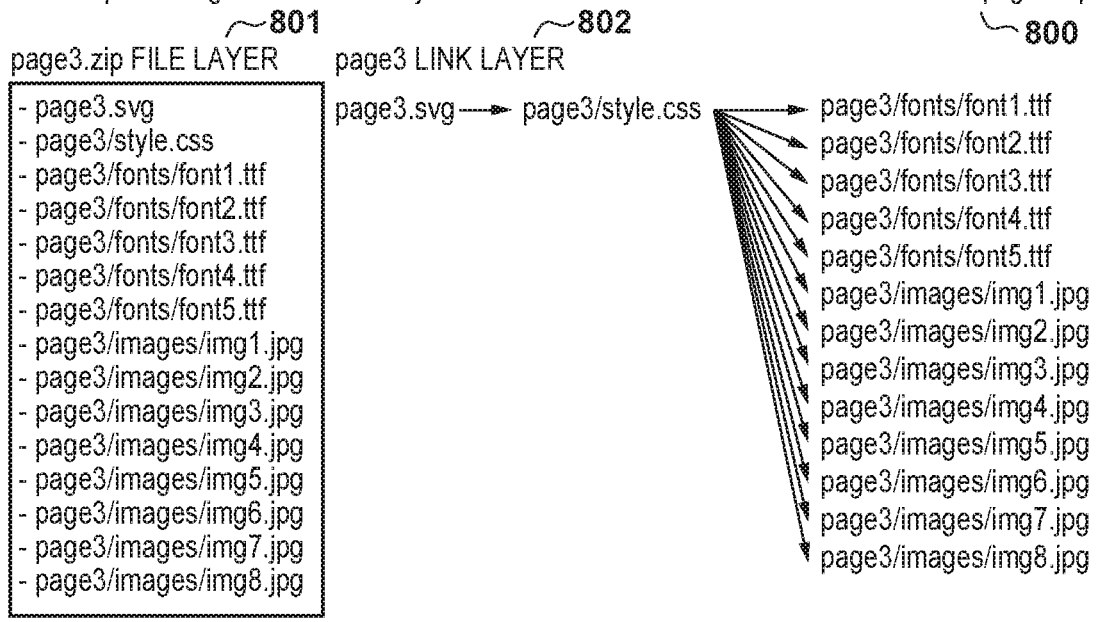

FIG. 8B page1 CACHE INFORMATION    811

```
-e31aafc9-7a6f-4f9f-9b4d-f3754bc08103/data/page1/style.css
-e31aafc9-7a6f-4f9f-9b4d-f3754bc08103/data/page1/fonts/font1.ttf
-e31aafc9-7a6f-4f9f-9b4d-f3754bc08103/data/page1/fonts/font2.ttf
-e31aafc9-7a6f-4f9f-9b4d-f3754bc08103/data/page1/fonts/font3.ttf
-e31aafc9-7a6f-4f9f-9b4d-f3754bc08103/data/page1/images/img1.jpg
-e31aafc9-7a6f-4f9f-9b4d-f3754bc08103/data/page1/images/img2.jpg
-e31aafc9-7a6f-4f9f-9b4d-f3754bc08103/data/page1/images/img3.jpg
-e31aafc9-7a6f-4f9f-9b4d-f3754bc08103/data/page1/images/img4.jpg
-e31aafc9-7a6f-4f9f-9b4d-f3754bc08103/data/page1/images/img5.jpg
``` page2 CACHE INFORMATION    812

```
-e31aafc9-7a6f-4f9f-9b4d-f3754bc08103/data/page2/style.css
-e31aafc9-7a6f-4f9f-9b4d-f3754bc08103/data/page2/fonts/font1.ttf
-e31aafc9-7a6f-4f9f-9b4d-f3754bc08103/data/page2/fonts/ font2.ttf
-e31aafc9-7a6f-4f9f-9b4d-f3754bc08103/data/page2/images/img1.jpg
-e31aafc9-7a6f-4f9f-9b4d-f3754bc08103/data/page2/images/img2.jpg
``` page3 CACHE INFORMATION    813

```
-e31aafc9-7a6f-4f9f-9b4d-f3754bc08103/data/page3/style.css
-e31aafc9-7a6f-4f9f-9b4d-f3754bc08103/data/page3/fonts/font1.ttf
-e31aafc9-7a6f-4f9f-9b4d-f3754bc08103/data/page3/fonts/font2.ttf
-e31aafc9-7a6f-4f9f-9b4d-f3754bc08103/data/page3/fonts/font3.ttf
-e31aafc9-7a6f-4f9f-9b4d-f3754bc08103/data/page3/fonts/font4.ttf
-e31aafc9-7a6f-4f9f-9b4d-f3754bc08103/data/page3/fonts/font5.ttf
-e31aafc9-7a6f-4f9f-9b4d-f3754bc08103/data/page3/images/img1.jpg
-e31aafc9-7a6f-4f9f-9b4d-f3754bc08103/data/page3/images/img2.jpg
-e31aafc9-7a6f-4f9f-9b4d-f3754bc08103/data/page3/images/img3.jpg
-e31aafc9-7a6f-4f9f-9b4d-f3754bc08103/data/page3/images/img4.jpg
-e31aafc9-7a6f-4f9f-9b4d-f3754bc08103/data/page3/images/img5.jpg
-e31aafc9-7a6f-4f9f-9b4d-f3754bc08103/data/page3/images/img6.jpg
-e31aafc9-7a6f-4f9f-9b4d-f3754bc08103/data/page3/images/img7.jpg
-e31aafc9-7a6f-4f9f-9b4d-f3754bc08103/data/page3/images/img8.jpg
```

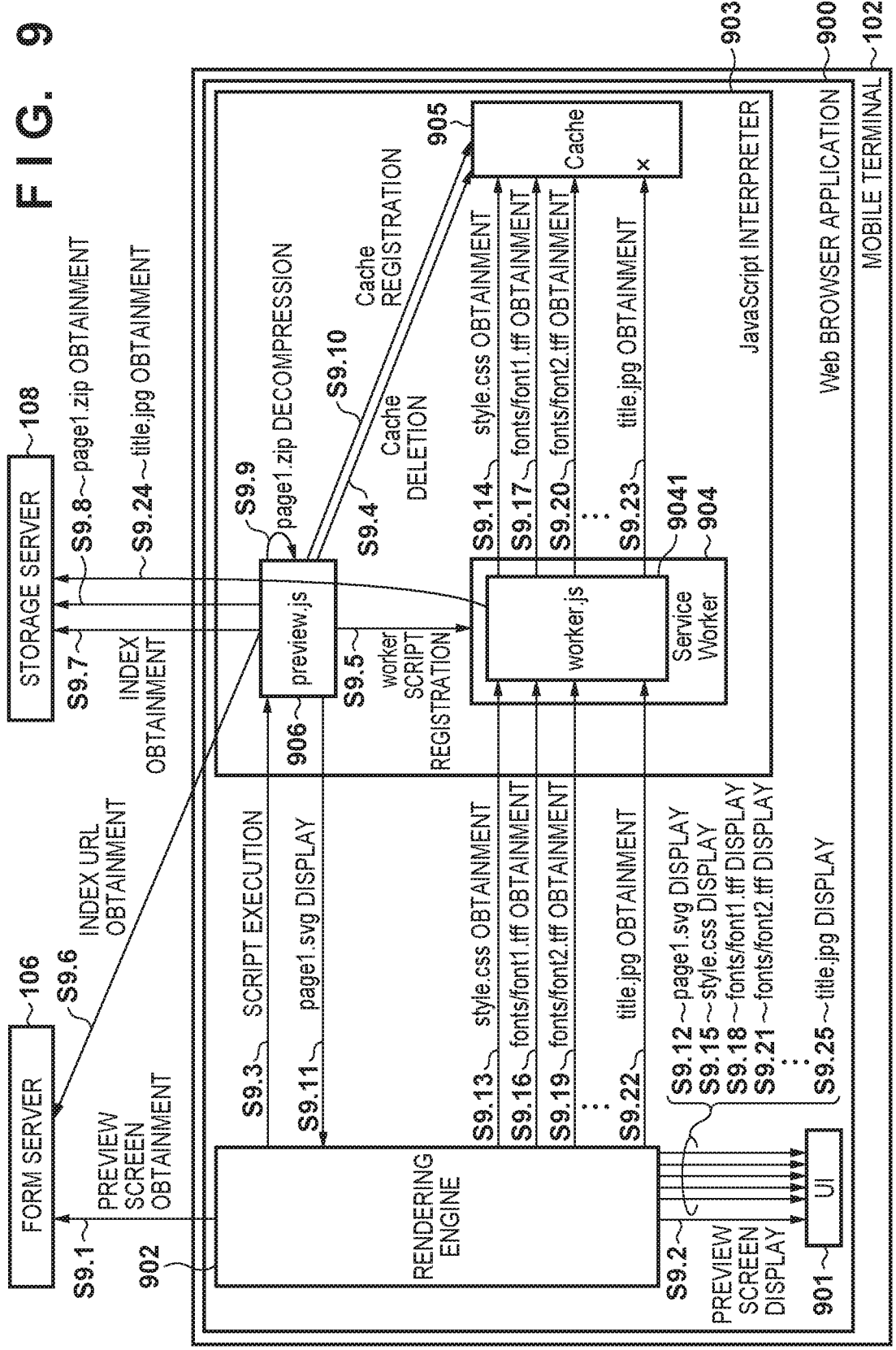

INFORMATION PROCESSING APPARATUS, DOCUMENT DISPLAY METHOD, DOCUMENT DISPLAY SYSTEM, AND MEDIUM

BACKGROUND OF THE INVENTION

Field of the Invention

The present invention relates to an information processing apparatus, a document display method, a document display system, and a medium, and, more particularly, to an information processing apparatus, a document display method, a document display system, and a medium, ail of which display a Web document formed from a plurality of files on a Web browser.

Description of the Related Art

In recent years, a cloud service form that provides a service to a client by making a server public on the Internet is gaining attention. The main feature of a cloud service is to distribute and execute data conversion and data processing by using many computing resources, and simultaneously process requests from many clients by parallel distribution processing. Currently, vendors that provide various kinds of services by installing Web services on a cloud service environment which implements a cloud service are increasing. In terms of the speed and the cost of development, it is advantageous for a client such as a Web browser or a mobile application to create a new function by effectively using these Web services which are publicly available on the Web. In addition, since there is no need to hold hardware such as a server machine or a network device and continuously perform maintenance, a cloud service is also advantageous in terms of operation.

In consideration of the advantage a cloud service has over a conventional on-premise system which has been widely used in offices, many offices are shifting from the on-premise system to the cloud service. Even a form processing system (a system that creates forms by applying the data of a client onto a template), which has been widely used In banks and in insurance companies and has been conventionally operated on premise, is expected to shift to a cloud service so that forms can be displayed on the Web.

The main use cases of forms in banks and in insurance companies are cases in which a salesperson engages in a contract negotiation by explaining a product and presenting a corresponding form to a client. Hence, in form generation, a form is designed beautifully and the display contents are designed in detail, and the resulting form becomes expressive and complex since many fonts, images, and graphs are used. Such a complex form is formed from many files such as an image file, a font file, and a style file. In order to display the form on a Web browser, these files need to be downloaded from a cloud service. However, many Web browsers can only simultaneously download 6 files in parallel. Therefore, when there are a large number of files, it will take time to download all of the form files, and the user is made to wait as it will take time for the forms to be displayed.

In Japanese Patent Laid-Open No. 2001-22631, there is disclosed a method of preventing file download delay by uniquely combining HTML (Hypertext Markup Language) files into a single file and causing a client-side helper application to restore and display the downloaded and combined files.

In the conventional technique, file download delay can be prevented by uniquely combining the HTML files into a single file and causing the client-side helper application to restore and display the combined files. However, in most tablet terminals it is difficult to cause the helper application and the Web browser to cooperate. In addition, since there are many types of tablet terminals, development of a helper application problematically becomes costly.

SUMMARY OF THE INVENTION

The present invention minimizes the delay when displaying a form by combining a plurality of files that form the form into a single file and decompressing and displaying the obtained file on a Web browser.

The present invention includes the following arrangement.

According to the first aspect of the present invention there is provided an information processing apparatus that is connected to a server that archives document data hierarchically formed by a plurality of files and stores the document data as a single file, comprising: a downloading unit configured to download the archived document data from the server, decompressing the archived document data, and storing a file forming a lower layer of the document data in a storage unit; a browser unit configured to access an access destination of the file forming the lower layer which is described in an upper layer file of the document data; and a readout unit configured to read out the file forming the lower layer by hooking the access and returning the read out file to the browser unit instead of the server, wherein the browser unit displays the document data based on the read out file.

According to the second aspect of the present invention, there is provided a document display system comprising: a server that archives document data hierarchically formed by a plurality of files and stores the document data as a single file; and an information processing apparatus that is connected to the server, wherein the information processing apparatus includes a downloading unit configured to download the archived document data from the server, decompressing the archived document data, and storing a file forming a lower layer of the document data in a storage unit, a browser unit configured to access an access destination of the file forming the lower layer which is described in an upper layer file of the document data, and a readout unit configured to read out the file forming the lower layer by hooking the access and returning the read out file to the browser unit instead of the server, wherein the browser unit displaying the document data based on the read out file, and the server generates document data in response to a request from the information processing apparatus, converts the generated document data into document data hierarchically formed from a plurality of files, archive the document data, and stores the archived document data as a single file.

According to the third aspect of the present invention, there is provided a non-transitory computer-readable medium which stores a program therein for causing a computer to function as an information processing apparatus that is connected to a server that archives document data hierarchically formed by a plurality of files and stores the document data as a single file, the information processing apparatus including: a downloading unit configured to download the archived document data from the server, decompressing the archived document data, and storing a file forming a lower layer of the document data in a storage unit, a browser unit configured to access an access destination of the file forming the lower layer which is described in an upper layer file of the document data, and a readout unit configured to read out the file forming the lower layer by hooking the access and returning the read cut file to the browser unit instead of the server, wherein the browser unit displays the document data based on the read out file.

According to the fourth aspect of the present invention, there is provided a document display method by an information processing apparatus that is connected to a server that archives document data hierarchically formed by a plurality of files and stores the document data as a single file, the method comprising: downloading the archived document data from the server, decompressing the archived document data, and storing a file forming a lower layer of the document data in a storage unit, causing a browser unit to access an access destination of the file forming the lower layer which is described in an upper layer file of the document data, and reading out the file forming the lower layer by hooking the accessing and returning the read out file to the browser unit instead of the server, wherein the browser unit displays the document data based on the read out file.

According to the present invention, a form can be more efficiently displayed by combining a plurality of files that form the form and decompressing and displaying the combined files that have been obtained on the Web browser.

Further features of the present invention will become apparent from the following description of exemplary embodiments with reference to the attached drawings.

BRIEF DESCRIPTION OF THE DRAWINGS

FIG. 1 is a view showing a system arrangement;

FIG. 2A is a block diagram showing a hardware arrangement of a mobile terminal;

FIG. 2B is a block diagram showing a hardware arrangement of each server;

FIG. 3B is a view showing another table structure managed in the form server;

FIG. 4A is a view showing a table structure managed in a data conversion server;

FIG. 4B is a view showing another table structure managed in the data conversion server;

FIG. 5 is a view showing a table structure managed in a storage server;

FIG. 6A is a view showing as example of a screen of a mobile terminal;

FIG. 6B is a view showing an example of another screen of the mobile terminal;

FIG. 7 is a chart showing the sequence of an SVG form preview process;

FIG. 8A is a view showing the zip structure of an SVG form;

FIG. 8B is a view showing the cache information of the SVG form;

FIG. 9 is a chart showing a display sequence of a zipped SVG form; and

DESCRIPTION OF THE EMBODIMENTS

Figure 3A:
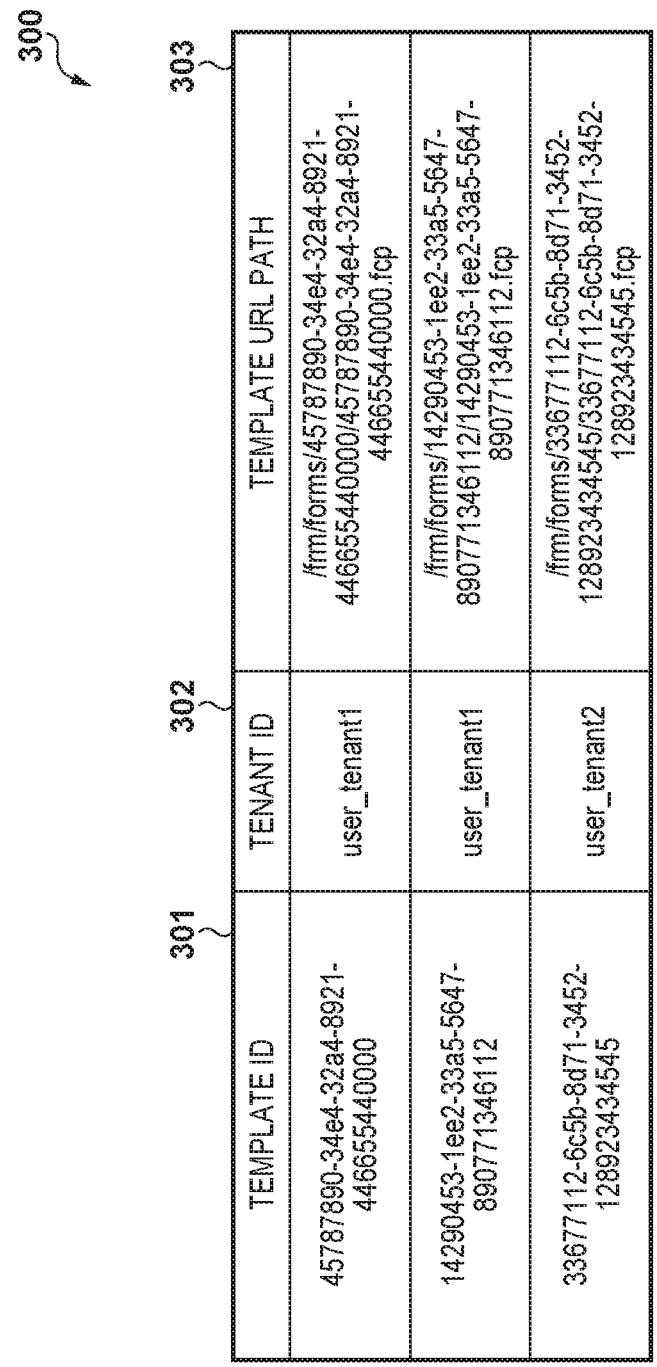
FIG. 3A is a view showing a table structure managed in a form server.

An embodiment of the present invention will be described below with reference to the accompanying drawings.

First Embodiment

<System Arrangement>

FIG. 1 is a view showing the overall arrangement of a form processing system according to an embodiment of the present invention. This form processing system can also be called a document display system since its purpose is to display documents in this embodiment. In FIG. 1, assume that a plurality of mobile terminals 102 are connected to the system via a local network 101. Each mobile terminal 102 can access servers 105 to 108 by accessing the Internet 100 via the local network 101. The mobile terminal 102 connects to a network via a wired or wireless LAN. In this embodiment, at is assumed that the mobile terminal 102 is connected to the network via a wireless LAN terminal 103. However, a case in which the mobile terminal 102 is connected to the network via a wireless network provided by a mobile data communication carrier is also assumed in this embodiment, as a matter of course. The wireless LAN terminal 103 is the master device of a wireless LAN which has a general network and router function and provides the wireless LAN in an office or a home.

An operation server 104 is a server that manages user operation information. This embodiment assumes a case in which products to be sold are managed for each client by the operation server 104 and a salesperson conducts sales to a client by using the information held in the operation server 104. The operation server 104 provides a screen to display and edit the user operation information in response to a request from a mobile terminal 102. The authorization server 105 is a server to implement OAuth, manages user information and client information, and issues and manages authorization tokens. The servers 105 to 108 belong to the security domain of the authorization server 105. An authorization token issued by the authorization server 105 is required in order to make a request to each of the servers 105 to 108. Each of the servers 105 to 108 will process a request only when the validity of the authorization token included in the request has been checked and permitted by the authorization server 105. As the validity check of the authorization token, there are the validity limit check and the license check.

The form server 106 is a server that generates and manages PDF (Portable Document Format) form data (to be also referred to as a PDF form hereinafter) by receiving the user operation information from the operation server 104 and reflecting the received user operation information onto a form template. The form server 106 makes a request to the data conversion server 107 to convert the generated PDF form into SVG (Scalable Vector Graphics) form format data (to be also referred to as an SVG form or Web form data hereinafter). The data conversion server 107 is a server that accepts the SVG form conversion request from the form server 106, converts the PDF form data into SVG form data, and manages the converted SVG data. The storage server 108 is a server that performs file management and accepts uploads and downloads of files from each mobile terminal 102, the form server 106, and the data conversion server 107. The PDF form data is generated as a predetermined unit of processing, and the data conversion server 107 converts the PDF form data into the SVG form data based on the unit of processing. In this embodiment, a unit of processing corresponds to 1 page. Hence, the PDF form generation processing related to a given form which is performed by the form server 106 and the SVG form generation processing of this form which is performed by the data conversion server 107 can be executed parallel to each other.

More specifically, based on the designated form and user, the form server 106 that received a preview generation request generates a PDF form for each unit of processing, stores the generated PDF form in the storage server 108, and records the URL which indicates the storage destination in a form index file. The form server 106 can designate the form which is the preview generation request target and send an SVG form generation request to the data conversion server 107. Upon completion of the generation of the PDF form, the form server 106 puts a mark on the corresponding form index file to note this completion. On the other hand, the data conversion server 107 that received the SVG form generation request, for example, periodically monitors the form index file of the designated form, obtains the PDF form by designating an added URL if a URL has been added, and converts the obtained. PDF form into an SVG form. The data conversion server 107 stores the SVG form in the storage server 108 and records a URL indicating its storage destination in a conversion index file. This processing is repeated until a mark indicating the completion of generation is detected. When the conversion has been completed, a mark indicating the completion of the conversion is added to the corresponding conversion index file. A user who wants to access the SVG form can obtain the SVG form by accessing the URL included in the conversion index file. Note that the form data is a document and may also be called document data.

Here, although each of the servers 105 to 108 is made public on the Internet as a cloud service formed by a plurality of redundant servers, this embodiment sets only one server for each server for the sake of descriptive convenience. Although the operation server 104 can also have a redundant arrangement by using a plurality of servers, only one server is used as the operation server 104 for the sake of descriptive convenience in this embodiment.

<Hardware Arrangement of Mobile Terminal 102>

FIG. 2A is a block diagram showing the hardware arrangement of the mobile terminal 102. Each hardware component connected to a system bus 202. A. RPM 204 stores an operation system and application programs (to be also referred to as applications hereinafter) for controlling data communication and phone calls, and each application is executed in a CPU 203. Email software, a Web browser, and the like are applications that control data communication. A RAM 205 is a work memory area for executing each program. The RAM is also a memory to temporarily store authorization information for accessing a Web service or Web data obtained from a Web server by the Web browser. A storage device 210 is a nonvolatile storage device and stores operation logs and various kinds of operation mode settings that need to be held even after the reactivation of the mobile terminal.

A network controller 206 controls the communication of a wireless LAM communication unit. 212 and a portable phone data communication unit 213 which is used for joining a network provided by a mobile carrier. In general, when the mobile terminal can join a wireless LAN network, the network controller 206 prioritizes the wireless LAN connection. When the mobile terminal is outside the network area of the wireless LAN, it joins a wireless communication network provided by the mobile carrier. A voice control unit 207 is mainly used when a communication application has microphone/loudspeaker 214 performs input and output of voice data, and the voice control unit 207 mediates between the microphone/loudspeaker 214 and its control program.

A display control unit 208 controls information output on a display 215 of the mobile terminal. The display 215 displays, for example, a Web form that has been downloaded from a cloud service. An input control unit 209 controls the information instructed by the user via a touch panel 216 or buttons of the mobile terminal. An application on the mobile terminal uses the voice control unit 207, the display control unit 208, and the input control unit 209 to provide the user with network communication information and various kinds of information in the mobile terminal. A location detection control unit 211 obtains the location information of the mobile terminal from a GPS sensor 217 and provides the obtained location information to the CS. These units are controlled by the OS operating in the CPU 203.

<Hardware Arrangement of Server>

FIG. 2B is a block diagram showing an example of the hardware arrangement of the servers 104 to 108. The present invention is applicable, unless otherwise specified, as a single device or as a system formed by a plurality of devices as long as the functions of the present invention are executable, as a matter of course. Also, the present invention is applicable, unless otherwise specified, to even a system in which processing is performed by connection via a network such as a LAN or a WAN as long as the functions of the present invention are executable, as a matter of course. This embodiment will be described assuming that components are connected to each other via a system bus 219.

A CPU 220 is a control device of an information processing apparatus and executes application programs, a print driver program, an operating system, and a mobile printing system program according to the present invention stored in a storage device 226. The CPU 220 also performs control to temporarily store information and files necessary for executing each program in a RAM 222. The CPU 220 executes various kinds of data processing by opening various windows registered based on respective commands instructed via a mouse curses (not shown) on a display 227. A ROM 221 is a nonvolatile storage unit and stores a program such as a basic I/O program, font data used at the time of document processing, and various kinds of data such as data for templates. The RAM 222 is a temporary storage unit and functions as a work area or the main memory of the CPU 220. A display control unit 224 controls information to be output on the display 227. An input control unit 225 controls information input via a keyboard 228. The information processing apparatus exchanges data with an external device via the input control unit 225. The storage device 226 is one of the external storage units and functions as a large capacity memory to store application programs, a print driver program, and an OS. The keyboard 228 is an instruction input unit and is a unit for the user to input instructions to each server. The display 227 is a display unit and is a unit that displays each command input from the keyboard 228.

<Web Browser Application. of Mobile Terminal 102>

A Web browser application 900 (refer to FIG. 9) is installed in the mobile terminal 102. The Web browser application installed in the mobile terminal 102 is stored in the storage device 210 shown in FIGS. 2A and 2B and is executed by being loaded to the RAM 205 by the CPU 203 as described above.

The user makes a request to each of the servers 104 to 108 by operating a screen displayed on the display 215 of the mobile terminal 102 by the Web browser application. The Web browser application can analyze HTML data and SVG data obtained from the operation server 104, the form server 106, and the storage server 108 and display the data on the screen. FIGS. 6A and 6B (to be described later) show examples of respective screens displayed on the display 215 of the mobile terminal 102 by the Web browser application.

Various kinds of applications other than the Web browser application can be installed in the mobile terminal 102. Since only the Web browser application will be used in this embodiment, the Web browser application will be described as the mobile terminal 102 in the following description.

<Data Managed by Form Server 106>

FIGS. 3A and 3B show data tables stored in the external memory by the form server 106. These data tables can be formed so that they are not stored in the external memory of the form server 106 but stored in another server that has been formed to be communicable via the Internet 100 or the local network 101. The data tables held by the form server 106 include template information 300 and preview information 310.

The template information 300 of FIG. 3A is information to manage each template held by the form server 106. A template ID 301 is an identifier for uniquely identifying a template and is issued when a template is registered in the form server 106. A tenant ID 302 is a tenant ID for a tenant that registered the template. The form server 106 controls the access to the templates in accordance with each tenant ID 302. A template URL path 303 is a URL path to the storage server 108 in which the template is stored. The form server 106 generates a URL path including the template ID 301 in the storage server 108 and stores the template in that UPI path. Accordingly, when the form server 106 is to use a designated template, the form server 106 accesses the template URL path 303 corresponding to the template ID 301 of the designated template. Then, the form server 106 creates the PDF form data by combining the field data of the user who requested the form with the form data included in this template.

The preview information 310 of FIG. 3B is information used by the form server 106 to manage the preview processing. A preview ID 311 is issued and registered by the form server 106 upon accepting a preview generation request. A tenant. ID 312 is the tenant ID of a tenant that made the preview generation request. A user ID 313 is the identifier of a user who made the preview generation request. A data conversion ID 314 is an identifier used by the form server 106 to identify the data conversion processing received in response to the SVG form generation request to the data conversion server 107. A PDF form DPI path 315 is the URL path of the storage server 108 in which the PDF form is stored. The form server 106 generates a URL path including the preview ID 311 in the storage server 108 and stores the PDF form data in that URL path.

<Data Managed by Data Conversion Server 107>

FIGS. 4A and 4B are data tables that are stored in the external memory of the data conversion server 107. The data tables held by the data conversion server 107 include document information 400 and data conversion information 410.

The document information 400 of FIG. 4A is a record generated by the data conversion server 107 upon receiving an SVG form generation request. A document ID 401 is an identifier used by the data conversion server 107 to uniquely identify a document issued when an SVG form generation request has been received. A tenant ID 402 is the tenant ID of a tenant that made the SVG form generation request. A user ID 403 is the identifier of a user who made the SVG form generation request. A document URL path 404 is the URL path of the storage server 108 in which the PDF form is stored. The URL path is transferred to the data conversion server 107 as the parameter of the SVG form generation request from the form server 106.

The data conversion information 410 of FIG. 4B is a record generated by the data conversion server 107 upon receiving an SVG form generation request. A data conversion ID 411 is an identifier used by the data conversion server 107 to uniquely identify the data conversion processing issued when an SVG form generation request has been received. A tenant ID 412, a user ID 413, and a document ID 414 have the same values as the tenant ID 402, the user ID 403, and the document ID 401, respectively, of the document information 400 generated by the data conversion server 107 when a data conversion request has been received. An index URL path 415 is a URL of the storage server 108 that stores a conversion index file which is a URL list of the SVG form data generated by the data conversion server 107 based on the PDF form data. In a case in which the generated SVG form data corresponds to a plurality of pages, the URLs in the storage server 108 of the plurality of SVG form data are stored in the index file. Upon completion of the generation of each SVG form, the data conversion server 107 generates and stores the index URL path 415 by including the data conversion. ID 411 in the URL path so that the SVG form will be unique in the storage server 108.

A status 416 indicates the data conversion status of the data conversion server 107 and is updated by the data conversion server 107 in accordance with the data conversion status. The status 416 can be "in standby" or "conversion complete".

<Data of Storage Server 108>

FIG. 5 is a data table stored in the external memory of the storage server 108. This data table can be formed not to be stored in the external memory of the storage server 108 but to be stored in another server that has been formed to be communicable via the Internet 100 or the local network 101. The data table held by the storage server 108 is formed by file information 500.

The file information 500 of FIG. 5 is information of each file stored in the storage server 108. A data URL 501 is an URL that can uniquely specify a file stored in the storage server 108. A file path 502 is a file path on the storage and indicates the storage location of the file. File operation in the storage can be performed by making a request to the data URL 501. For example, by requesting an HTTP GET method to the data URL 501, a corresponding file can be downloaded. A file can be uploaded and stored by making a request to the data URL 501 by attaching the file to an HTTP PUT method. By requesting an HTTP delete method to the data URL 501, a corresponding file can be deleted.

<Screen of Mobile Terminal 102>

FIGS. 6A and 6B are examples of Web browser application screens displayed on the mobile terminal 102 and are screens that are to be displayed on the display 215 via the display control unit 208 in FIG. 2A.

A sales negotiation screen. 600 of FIG. 6A is a screen for displaying user operation information. Upon accepting a sales negotiation screen display request from the mobile terminal 102, the operation server 104 responds by displaying the sales negotiation screen 600 which includes the user operation information. When a form generation button 601 is pressed on the sales negotiation screen 600, the operation server 104 executes the form generation request. A preview screen 610 of FIG. 6B a screen for displaying an SVG form, is generated by the form server 106, and displayed on the screen of the mobile terminal 102.

<SVG Form Preview Sequence>

FIG. 7 shows a processing sequence from when the form generation button 601 is pressed on the sales negotiation screen 600 until the preview screen 610 is displayed. Note that the form server 106, the data conversion server 107, and the storage server 108 belong to the security domain of the authorization server 105, and a request to each server requires an authorization token issued by the authorization server 105. The form server 106, the data conversion server 107, and the storage server 108 request the authorization server 105 to confirm the validity of the authorization token received in each request and obtain user information such as the user ID and tenant ID linked to the authorization token. Although authorization tokens are included in all requests accepted by the form server 106, the data conversion server 107, and the storage server 108 in FIG. 7, they have been omitted in FIG. 7 since the processing is not directly related to the invention of this embodiment.

In S7.1, when the form generation button. 601 is pressed on the sales negotiation screen 600, a form generation request is made from the mobile terminal 102 to the operation server 104. Upon accepting the form generation request, the operation server 104 performs the processes of S7.2 and S7.3 and responds to the mobile terminal 102 in S7.4.

In S7.2, the operation server 104 makes a preview generation request to the form server 106. The operation server 104 designates the data conversion ID 411 and the operation information which is to be designated on the sales negotiation screen 600 as a parameter of the preview generation request in S7.2.

Upon accepting the preview generation request in S7.2, the form server 106 issues the preview ID 311, designates the tenant ID and the user ID of the preview generation request as the tenant ID 312 and the user ID 313, respectively, and registers these IDs in the preview information 310 as a record. Subsequently, the form server 106 transmits the preview ID 311 which has been issued to the operation server 104 as a response to the preview generation request in S7.2.

In S7.2-1, the form server 106 specifies, from the template information 300, a template matching the template ID received as a parameter of the preview generation request in S7.2 and obtains the template file from the template URL path of the specified template. The form server 106 reflects, onto the template file, the operation information received as a parameter in the preview generation request in S7.2 and generates a PDF form. The form server 106 generates a URL path on the storage server 108 from the preview ID 311, registers the generated URL path in the PDF form. URL path 315, and uploads the generated PDF form onto the PDF form. URL path 315.

In S7.2-2, the form server 106 makes an SVG form generation request to the data conversion server 107. The form server 106 designates the PDF form URL path 315 as the parameter of the SVG form generation request.

Upon receiving the SVG form generation request of S7.2-2, the data conversion server 107 issues the document ID 401 and the data conversion ID 411 and registers the issued IDs in the document information 400 and the data conversion information 410 as a record. Here, as the tenant IDs 402 and 412 and the user IDs 403 and 413, the tenant ID and the user ID that made the SVG form generation request are registered. Also, the PDF form URL path serving as the parameter or the SVG form generation request of S7.2-2 is registered in the document URL path 404. The same ID as the document ID 401 of the document information. 400 is registered as the document. ID 414. The data conversion server 107 returns the data conversion ID 411 that has been issued as a response to the SVG form generation request of S7.2-2 to the form server 106. Upon receiving the data conversion ID as a response to the SVG form generation request of S7.2-2, the form server 106 registers the received data conversion ID as the data conversion ID 314 of the preview information 310.

In S7.2-3, the data conversion server 107 obtains the PDF form from the document URL path 404 and converts the obtained PDF form into the SVG form. Although the SVG form generated by the data conversion server 107 is formed from a plurality of files such as a font file and an image file other than the SVG file, the data conversion server 107 combines and compresses this plurality of files into one zip file. The SVG form generated by the data conversion server 107 will be described in detail later in FIG. 8A.

In S7.2-4, the data conversion server 107 generates the SVG form URL path and the index URL path in the storage server 108 and uploads the zipped SVG form onto the SVG form URL path. The data conversion server 107 uploads a conversion index file which is a list of the SVG form URL paths onto the index URL path. The data conversion server 107 registers the index URL path 415 to the data conversion information 410. The PDF form and the SVG form each are generated as a predetermined unit of processing, for example, on a page basis. Hence, a URL is also designated for each unit of processing.

In S7.3, the operation server 104 makes a preview URL obtainment request to the form server 106. The operation server 104 designates, as the parameter of the preview URL obtainment request of S7.3, the preview ID received as a response to the preview generation request of S7.2. Note that the operation server 104 executes the preview URL obtainment request of S7.3 immediately after it receives the response of the preview generation request of S7.2 without synchronizing with the processes of the aforementioned S7.2-1 to S7.2-4.

Upon accepting the preview URL obtainment request of S7.3, the form server 106 specifies, from the preview information 310, a record that matches the preview ID received as a parameter. The form server 106 returns the preview screen URL of the form server 106 as the response to the preview URL obtainment request of S7.3. As the URL parameter of the preview screen URL of the form server 106 which is to be returned here, the preview ID received in S7.3 is designated.

In S7.4, the operation server 104 returns, to the mobile terminal 102, the preview screen URL of the form server 106 received in S7.3 as the response of S7.1.

In S7.5, the mobile terminal 102 makes a preview screen obtainment request to the preview screen URL and displays the preview screen 610.

In S7.6, the mobile terminal 102 makes an index URL obtainment request to the form server 106. In the index URL obtainment request, the preview ID which has been designated as the URL parameter of the preview screen URL is designated as the parameter.

The form server 106 specifies, from the preview information 310, a record that matches the preview ID designated in the index URL obtainment request of S7.6. Here, if the corresponding data conversion ID 314 has not been registered in the specified preview information 310, the form server 106 transmits an error response in S7.6 to indicate that an index has not been generated for the PDF form. If an error occurs in the index URL obtainment request of S7.6, the mobile terminal 102 repeats making the index URL obtainment request of S7.6 until the error is resolved.

In S7.6-1, if the data conversion ID 314 is registered in the preview information 310 specified in S7.6, the form server 106 makes the index URL obtainment request to the data conversion server 107 by using the data conversion ID 314 as the parameter.

Upon receiving the index URL obtainment request, the data conversion server 107 specifies, from the data conversion information 410, a record matching the data conversion ID of the parameter of the index URL obtainment request. Ii the status 416 of the specified data conversion information 410 is "conversion complete", the data conversion server 107 returns the index URL path 415 as the response of S7.6-1 to the form server 106. The form server 106 returns the index URL path received as a response of S7.6 to the mobile terminal 102. Here, if the status 416 of the specified data conversion information 410 is other than "conversion complete", the data conversion server 107 returns, as the response of S7.6-1 to the form server 106, an error indicating that the SVG form has not been generated. The form server 106 makes an error response in S7.3. The mobile terminal 102 retries the request until the SVG form is generated in S7.6 and the corresponding index URL path is received.

In S7.7, the mobile terminal 102 obtains an index from the index URL path obtained as the response of S7.6. Subsequently, the mobile terminal 102 obtains the zipped SVG form from the SVG form. URL described in the obtained index and displays the obtained SVG form on the preview screen 610.

The processing sequence of the mobile terminal 102 S7.5 to S7.7 will be described in detail with reference to FIG. 9.

<Zip Structure and Cache information SVG Form>

FIG. 8A is an example of pages 1 to 3 of the structure of the SVG form that the data conversion server 107 has converted from the PDF form and has made into a zip file. Zipping is the operation of converting a file into a zip file format. A zip file format is a format in which a plurality of files are combined into a single file and handled together (that is, archived).

The zipped SVG form is stored in the storage server 108, and the mobile terminal 102 can access an URL 800 of the zipped SVG form to obtain the SVG form. The URL 800 of the zipped. SVG form includes the data conversion ID 411 and a page number and can uniquely identify the SVG form.

Each file layer of the zipped SVG form is formed in the manner of a file layer 801. Other than the SVG file, the zipped SVG form includes a CSS file, a font file, an image file, and the like. The file layer 801 is recorded in a central directory of the zip file and each file included in the zip file can be specified by the central directory.

A link layer 802 indicates the link layer with reference to an SVG file. An SVG file is linked to a CSS file, and a CSS file is linked to a font file or an image file. By loading the SVG file that serves as a reference by the Web browser application, a CSS file, a font file, and image file that are linked to the SVG file can be loaded.

FIG. 8B is the cache information of the SVG form of the Web browser application operating in the mobile terminal 102. Cache information 811 includes the data conversion ID 411 and a page number based on the subpath of the URL 800 of the zipped. SVG form and the file layer 801 of the zipped SVG form shown in FIG. 8A. That is, the cache information 811 is formed so that a cache is specifiable from the subpath (or at least a part of the subpath) of the URL 800 of the zipped SVG form and the file layer 801 of the zipped SVG form.

By matching the path layer by the zip structure of the SVG form, the link layer, and the cache information in the above-described manner, the cache information can be specified easily.

<Display Sequence of Zipped SVG Form of Mobile Terminal 102>

FIG. 9 shows the detailed processing sequence of the mobile terminal 102 in S7.5 to S7.7 of FIG. 7. The Web browser application 900 operating in the mobile terminal 102 is formed from an UI 901, a rendering engine 902, and a JavaScript® interpreter 903. Note that the notation of the trademark will be omitted for JavaScript® hereinafter.

The UI 901 displays a screen on the display 215 of the mobile terminal 102, detects a touch operation from the user, and notifies a JavaScript program of the touch operation event via the JavaScript interpreter 903.

The rendering engine 902 analyzes a structural document such as an html file or an SVG file that can be displayed by the Web browser application 900 and displays the analyzed document on the UI 901. The rendering engine 902 holds the analysis result of the html file or an SVG file as a DOM (Document Object Model). DOM can be edited from a JavaScript program, and the rendering engine 902 detects that the DOM has been changed and instructs a screen change operation to the UI 901 in accordance with the contents of the change.

The JavaScript interpreter 903 is the execution environment of a JavaScript program. If the execution of a JavaScript program is designated as a result of the analysis of the html file and the SVG file by the rendering engine 902, the JavaScript program is transferred to the JavaScript interpreter 903 and executed. In this embodiment, the execution of a JavaScript program has been designated by a preview.js 906 in the html file for displaying the preview screen 610, and this program is executed in the JavaScript interpreter 903.

A service worker 904 and a cache 905 are included in the JavaScript interpreter 903. The service worker 904 and the cache 905 each provide an API (Application Programming Interface) so that a JavaScript program can be used. In this embodiment, the preview.js 906 and a worker.js 9041 (to be described later) use the APIs of the service worker 904 and the cache 905 to use their respective functions.

The service worker 904 provides a function to cause a JavaScript program to reside in the Web browser application 900. It is possible to cause a JavaScript program that has been registered in the service worker 904 to operate in the background regardless of the screen operation on the Web browser application 900. The JavaScript program that has been registered in the service worker 904 can also be formed to hook a data obtainment request from the rendering engine 902 to each server. In this embodiment, a JavaScript program called the worker.js 9041 is registered in the service worker 904, and the worker.js 9041 hooks the SVG form data obtainment request.

The cache 905 provides a data cache function to the JavaScript program in the form of key-value pairs. The JavaScript program can add, refer to, or delete a piece of cache information by designating a key. In this embodiment, a file forming the SVG form can be stored in the cache 905 by using each piece of cache information described on FIG. 8B as the key.

The sequence of processing at the time of form preview will be described. When the Web browser application 900 is instructed, for example, to open a preview screen URL via the UI 901, the rendering engine 902 connects (accesses) to the preview screen URL in S9.1. The preview screen URL points to the form server 106, and the rendering engine 902 obtains an html file of the preview screen from the form server 106.

In S9.2, the rendering engine 902 analyzes the html file of the preview screen obtained in S9.1 and displays the preview screen on the UT 901.

In S9.3, since a link to the file of the preview.js 906 is described in the html file of the preview screen obtained in S9.1, the rendering engine 902 obtains the preview.js file and executes the file in the JavaScript interpreter 903. Here, although the preview.js file is stored in the form server 106 and the rendering engine 902 obtains the preview.js file from the form server 106, a description thereof has been omitted from FIG. 9.

In S9.4, before downloading the archived SVG form, the preview.js 906, which is being executed, deletes all of the pieces of cache information stored in the cache 905 via the API provided by the cache 905.

In S9.5, the preview.js 906 registers the worker.js 9041 in the service worker 904. Here, the worker.js file is stored in the form server 106, and the preview.js 906 registers the URL of the worker.js file in the service worker 904. Although the service worker 904 obtains the worker.js file from the URL of the worker.js file which has been registered and executes the worker.js file, a description thereof has been omitted in FIG. 9.

In S9.6, the preview.js 906 makes an index URL obtainment request to the form server 106. S9.6 is the same as the process of S7.6 in FIG. 7, and a description thereof will be omitted.

In S9.7 and S9.8, the preview.js 906 accesses the obtained index URL, obtains an index, and obtains the zipped SVG form described in the URL in the index. The processes of S9.7 and S9.8 are the same as the process of S7.7 in FIG. 7, and a description thereof will be omitted. S9.8 is an example in which a page1.zip has been obtained as the archived. SVG form. A description will be given using the page1.zip as an example in FIG. 9.

In S9.9, the preview.js 906 decompresses (unzips) the zipped SVG form (page1.zip) obtained in S9.8. The file layer 801 of the SVG form described in FIGS. 8A and 8B can be obtained by decompressing the zipped. SVG form in S9.9.

In S9.10, the preview.js 906 registers, is the cache 905, the SVG form file layer 801 which was obtained by decompressing the zipped SVG form in S9.9. FIG. 8B shows the key 811 as an example of the cache information which is to be registered here. The key which is to be cached is the path information indicating the path when it had been originally stored in the storage server 108, and the file is cached so that the file can be specified by using this path information as the key. The key information which is to be cached may be any piece of information as long as the file can be uniquely specified.

In S9.11, the preview.js 906 adds, to the DOM (Document Object Model) of the rendering engine 902, the SVG file (page1.svg) obtained by decompressing the zipped SVG form in S9.9. Adding the SVG file to the DOM causes the rendering engine 902 to analyze the added SVG file and display the SVG form on the screen. In S9.11, the file which is added to the DOM of the rendering engine 902 by the preview.js 906 used the SVG file (page1.svg) whose name matches the name of the zipped SVG form file (page1.zip) other than the portion indicating the extensions. However, the name of the SVG file may be specified by a general fixed file name such as index.svg or all of the SVG files at the head (root) of the file layer may be added to the DOM. Although SVG is used as the data format in this embodiment, another format such as an html file may also be used. In the case of an html file, page1.html is added to the DOM. In the case of a fixed file name, index.html is added to the DOM.

In S9.12, upon detecting that the SVG file (page1.svg) has been added to the DOM, the rendering engine 902 displays the SVG file (page1.svg).

The rendering engine 902 obtains all of the files linked to the SVG file (page1.svg) by repeatedly performing the obtainment processing in accordance with the number of files in S9.13, S9.16, and S9.19. Although FIG. 9 shows an example in which three files are obtained in S9.13, S9.16, and S9.19, all of the files linked to the SVG file (page1.svg) are obtained. The link layer 802 which has the SGV file (page1.svg) as the reference has been described in FIG. 8A.

In S9.13, S9.16, and S9.19, the destination which is to be accessed by the rendering engine 902 is the storage server 108 which is the same as the target SVG file. However, the worker.js 9041 is formed to hook the data obtainment request of the SVG form and repeatedly accepts a number of requests corresponding to the number of files made from the rendering engine 902 in S9.13, S9.16, and S9.19.

In S9.14, S9.17, and S9.20, the worker.js 9041 obtains, from the cache 905, the cached files based on the URL of each request repeatedly accepted for the number of files in S9.13, S9.16, and S9.19 and repeatedly responds to S9.13, S9.16, and S9.19 in accordance with the number of files. Although the URL of each request in S9.13, S9.16, and S9.19 has been omitted since the URL of each request is shown by a relative path in FIG. 9, the URL of each request also includes, other than the file name, a data conversion ID and a page number, and it is possible to specify the corresponding file from the cache information (FIG. 8B) of cache 905.

In S9.15, S9.18, and S9.21, the rendering engine 902 repeatedly displays each file received in S9.13, S9.16, and S9.19 in accordance with the number of files.

S9.22 to S9.25 show an example when obtainment of a file not in the cache information. 811 (FIG. 8B) of the cache 905 has been performed. In a case in which the cache information (FIG. 8B) of the cache 905 has been deleted or in a case in which a file not included in the zipped SVG form has been requested, no cache is present in the cache information (FIG. 8B) of the cache 905. In S9.22, when the rendering engine 902 makes a request to obtain a file (title.jpg) not present in the cache information, the worker.js 9041 hooks the request, and the worker.js 9041 tries to obtain the cache information from the cache 905 in S9.23. If the obtainment of the cache from the cache 905 has failed, the worker.js 9041 makes, in S9.24, an obtainment request to the URL of the original request in S9.22 and sets the obtained file as a response of S9.22.

In S9.25, the rendering engine 902 displays the file received in S9.22.

As described above, an SVG form which is formed from a plurality of files is zipped, and the zipped SVG form obtained by the Web browser application 900 is decompressed and displayed. As a result, the number of requests from the Web browser application 900 to the server can be greatly reduced, and the SVG form can be efficiently displayed. In addition, by including a unique data conversion ID and a page number in the URL of the SVG form and the cache information in the Web browser application 900, it is possible to process different SVG forms and pages in the Web browser application 900. Furthermore, when there is no cache file in the cache information of the Web browser application. 900, the SVG form can be displayed without an error by obtaining the cache file from the server.

<Procedure of Deleting Cache Information. of Mobile Terminal 102>

Figure 10:
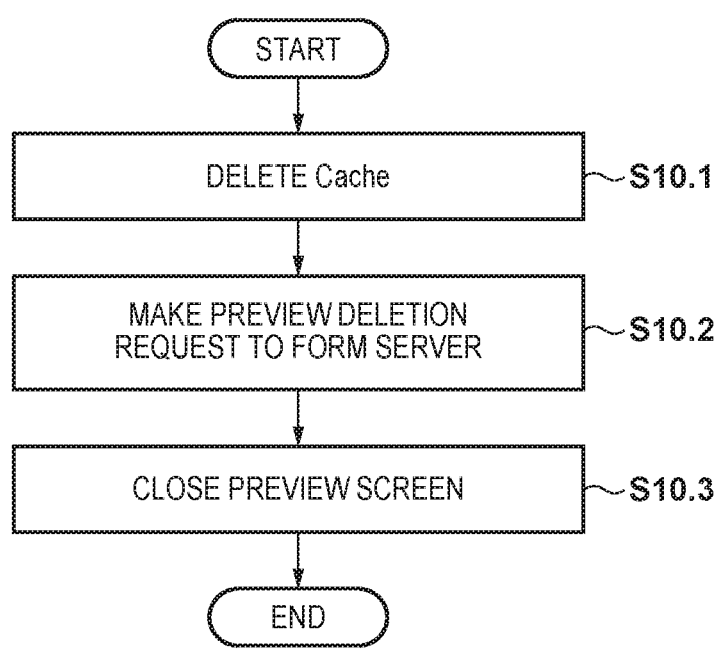
FIG. 10 is a flowchart showing the periodic deletion procedure of the cache information.

FIG. 10 is a flowchart showing the procedure of processing in which the preview.js 906 deletes the cache information (FIG. 8B) stored in the cache 905 in S9.10 in FIG. 9.

In step S10.1, the preview.js 906 deletes all of the pieces of cache information (FIG. 8B) stored in the cache 905 when a predetermined time has elapsed since the preview screen 610 has been displayed or when the user has not made an operation for a predetermined time. That is, the procedure of FIG. 10 is executed when a predetermined time has elapsed since the preview screen 610 has been displayed or when the user has not operated the terminal for a predetermined time, and the cache is deleted in step S10.1.

In step S10.2, the preview.js 906 makes a preview delete request to the form server 106. The preview ID is designated as a parameter to the preview delete request, and the form server 106 which accepts the request deletes the record that has the matching preview ID from the preview information 310 and deletes the PDF form data and the SVG form data stored in the storage server 108.

In step S10.2, the preview.js 906 closes the preview screen 610 so the user will not be able to use the screen.

As a result, by deleting the cache information in the Web browser application 900 when a predetermined time has elapsed from the display of the preview screen 610 or when the user has not made an operation for a predetermined time, no unnecessary cache information will remain.

As described above, according to this embodiment, the Web form data (SVG form data) is generated as a predetermined unit of processing (for example, a page) by the form server or the data conversion server. Together with this generation process, even in a case in which the unit of processing is formed by a plurality of files, they can be downloaded to a terminal as a single obtained by archiving and compiling these files. As a result, since there is no need to individually download each of a plurality of files forming a single unit of processing, quick display of a Web form is possible. Also, since each downloaded file is cached, a general-purpose Web browser can be used by accessing the cache by script.

Note that although the Web form data has an SVG format in this embodiment, it may have, for example, another hierarchical arrangement as long as it is a format suitable for display on a browser. In any case, the embodiment according to the invention will have the following arrangement.

Archived form data is downloaded and decompressed, and a file which is on the upper layer of the form data and includes a link to a file forming the lower layer is returned to a Web browser. The file forming the lower layer is stored in a storage cache. The Web browser executes an access operation by setting, as the access destination, the link to the lower layer file included in the upper layer file of the form data. Then, the access operation is hooked in the client, and each cached file is read out, returned to the Web browser, and displayed on the browser.

OTHER EMBODIMENTS

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, as optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-200473, filed Oct. 11, 2016, which is hereby incorporated by reference herein in its entirety.

What is claimed is:

1. An information processing apparatus that is connected to a server that archives document data hierarchically formed by a plurality of files and stores the document data as a single file, comprising:
    a downloading unit configured to download the archived document data compressed from the server, decompress the archived document data, and store a plurality of lower layer files of the document data in a storage unit;
    a browser unit configured to transmit an obtainment request to obtain each of the plurality of lower layer files to the server multiple times according to an upper layer file of the document data;
    a hooking unit configured to repeatedly hook the obtainment requests that are transmitted to the server multiple times by the browser unit; and
    a readout unit configured to read a portion of the plurality of lower layer files from the storage unit each time the obtainment request is hooked and return the read portion of the plurality lower layer file to the browser unit on behalf of the server,
    wherein the browser unit displays the document data based on the read out file.

2. The apparatus according to claim 1, wherein the downloading unit deletes the file stored in the storage unit before downloading the archived document data.

3. The apparatus according to claim 1, wherein the downloading unit deletes the file stored in the storage unit in one of a case in which a predetermined time has elapsed since the document data has been displayed and a case in which a user has not made an operation for a predetermined time.

4. The apparatus according to claim 1, wherein the downloading unit stores a file forming the lower layer of the document data with at least one portion of a path used when the file had been stored in the server, and the readout unit returns the file stored with a path that matches the portion of a destination designated in the obtainment request.

5. The apparatus according to claim 1, wherein the document data is archived and stored as a predetermined unit of processing, and
the downloading unit downloads the archived document data as the predetermined unit of processing.

6. The apparatus according to claim 1, wherein the download unit and the readout unit are implemented by a script executed by the browser unit.

7. The apparatus according to claim 1, wherein the browser unit makes a preview request of the document data to the server in response to an operation, and
the server generates, archives, and stores the document data in response to the preview request.

8. The apparatus according to claim 1, wherein the document data has an SVG (Scalable Vector Graphics) format, and the upper layer file includes a link to a lower layer file, and
the browser unit tries to obtain the lower layer file using the link.

9. A document display system comprising:
a server that archives document data hierarchically formed by a plurality of files and stores the document data as a single file; and
an information processing apparatus that is connected to the server,
wherein the information processing apparatus includes
a downloading unit configured to download the archived document data compressed from the server, decompressing the archived document data, and storing a plurality lower layer files of the document data in a storage unit;
a browser unit configured to transmit an obtainment request to obtain each of the plurality of lower layer files to the server multiple times according to an upper layer file of the document data,
a hooking unit configured to repeatedly hook the obtainment requests that are transmitted to the server multiple times by the browser unit; and
a readout unit configured to read a portion of the plurality lower layer file from the storage unit each time the obtainment request is hooked and return the read portion of the plurality lower layer file to the browser unit on behalf of the server,
wherein the browser unit displaying the document data based on the read out file, and
the server generates document data in response to a request from the information processing apparatus, converts the generated document data into document data hierarchically formed from a plurality of files, archive the document data, and stores the archived document data as a single file.

10. A non-transitory computer-readable medium which stores a program therein for causing a computer to function as an information processing apparatus that is connected to a server that archives document data hierarchically formed by a plurality of files and stores the document data as a single file, the information processing apparatus including:
a downloading unit configured to download the archived document data compressed from the server, decompress the archived document data, and store a plurality of lower layer files of the document data in a storage unit,
a browser unit configured to transmit an obtainment request to obtain each of the plurality of lower layer files to the server multiple times according to an upper layer file of the document data,
a hooking unit configured to repeatedly hook the obtainment requests that are transmitted to the server multiple times by the browser unit; and
a readout unit configured to read a portion of the plurality lower layer file from the storage unit each time the obtainment request is hooked and return the read portion of the plurality of lower layer files to the browser unit on behalf of the server,
wherein the browser unit displays the document data based on the read out file.

11. A document display method by an information processing apparatus that is connected to a server that archives document data hierarchically formed by a plurality of files and stores the document data as a single file, the method comprising:
downloading the archived document data compressed from the server, decompressing the archived document data, and storing a plurality of lower layer files of the document data in a storage unit,
causing a browser unit to transmit an obtainment request to obtain each of the plurality of lower layer files to the server multiple times according to an upper layer file of the document data,
repeatedly hooking the obtainment requests that are transmitted to the server multiple times by the browser unit; and
reading a portion of the plurality of lower layer files from the storage unit each time the obtainment request is hooked and returning the read portion of the plurality of lower layer files to the browser unit on behalf of the server,
wherein the browser unit displays the document data based on the read out file.

* * * * *